Dec. 29, 1931.   C. E. TANNEWITZ   1,838,164
BAND SAW WHEEL AND TIRE THEREFOR
Filed Sept. 3, 1931
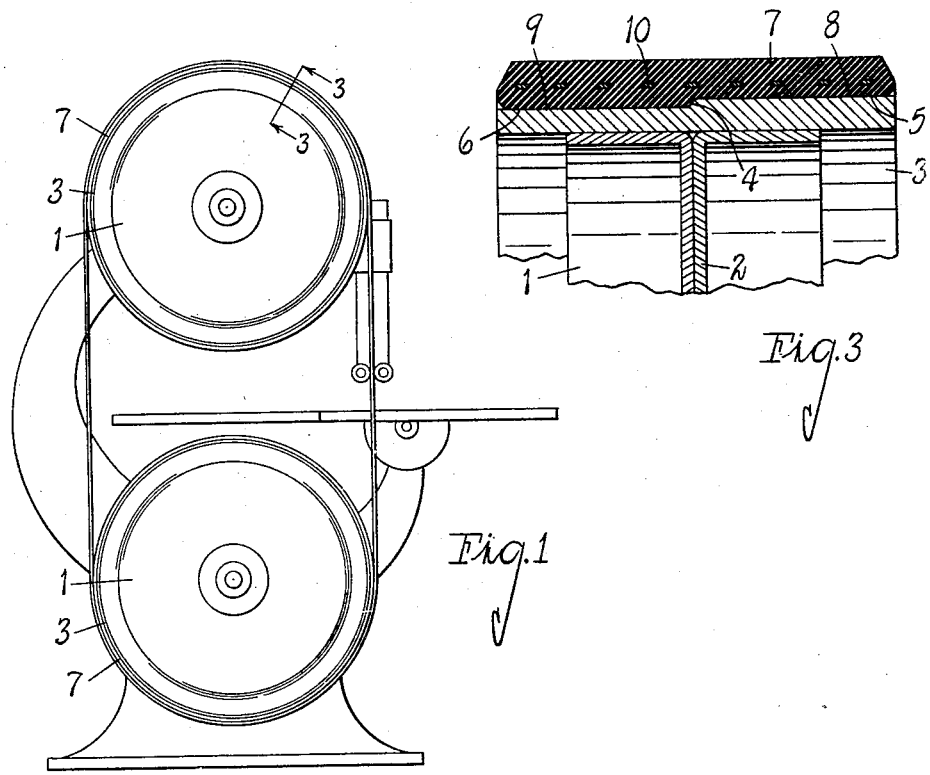
Fig.1
Fig.3
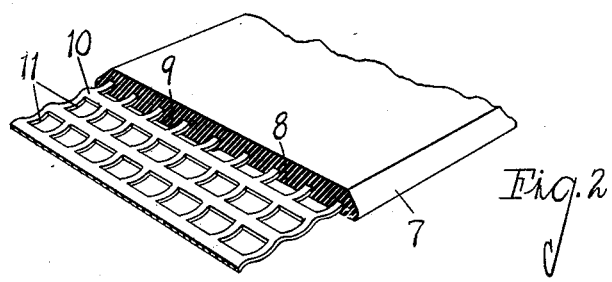
Fig.2
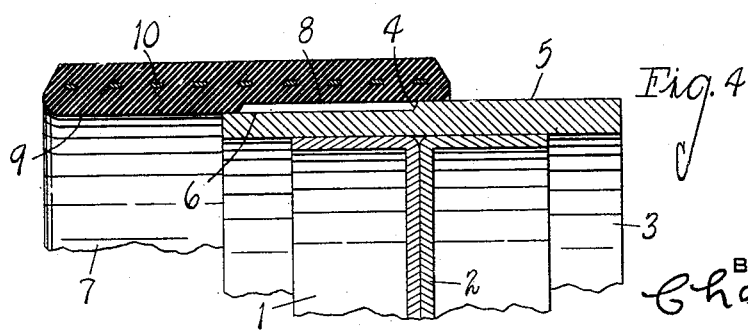
Fig.4
INVENTOR
Carl E. Tannewitz
BY
Chappell & Earl
ATTORNEYS Patented Dec. 29, 1931

1,838,164

UNITED STATES PATENT OFFICE

CARL E. TANNEWITZ, OF GRAND RAPIDS, MICHIGAN

BAND SAW WHEEL AND TIRE THEREFOR

Application filed September 3, 1931. Serial No. 560,975.

The main objects of this invention are:

First, to provide a rubber tired band saw wheel in which the tire is securely retained without the requirement of additional clamps or special securing means which affects the balance of the wheel.

Second, to provide a rubber tired band saw wheel in which the tire is very strong and durable and at the same time not of excessive cost.

Third, to provide a rubber tired band saw wheel in which the tire may be quickly applied or removed without the aid of special tools and at the same time is securely retained.

Fourth, to provide a band saw tire which is very flexible and may be reduced to a compact package for packing or storage without injury thereto.

Objects pertaining to details and economies of my invention will definitely appear from the description to follow. The invention is defined in the claims.

A structure which embodies the features of my invention is clearly illustrated in the accompanying drawings, in which:

Fig. 1 is a front elevation of a bandsaw machine embodying the features of my invention, various parts being shown mainly in conventional form.

Fig. 2 is a fragmentary perspective view of my improved band saw wheel tire.

Fig. 3 is an enlarged fragmentary section on line 3—3 of Fig. 1.

Fig. 4 is a fragmentary section corresponding to Fig. 3 illustrating the manner of assembling or mounting the tire on the rim.

In the accompanying drawings the band saw machine is shown mainly in conventional form and is provided with band saw wheels 1 having disk-like webs or spoke elements 2 provided with metal rims 3. The rims 3 are annularly stepped providing an annular shoulder 4. This shoulder is centrally located so that the wheel is provided with an annular portion 5 of a diameter exceeding the annular portion 6.

The tire 7 is formed of rubber or rubber composition and has substantial elasticity or resilience. The tire is internally stepped to complement the external steps of the rim. The internal diameter of the stepped portion 8 of the tire is somewhat less than the external diameter of the stepped portion 5 of the rim but of greater internal diameter than the stepped portion 6 of the rim. The internal diameter of the stepped portion 9 of the tire is, however, less than the external diameter of the stepped portion 6 of the rim, so that when the tire is forced upon the rim it is under stress.

The tire has a reinforcing core of foraminate resilient metal completely embedded therein. This reinforcement 10 has transversely alined rows 11 of openings of substantial size, these openings being preferably rectangular in shape as illustrated and of uniform dimensions. The reinforce is transversely corrugated or crimped, these corrugations or crimps extending from edge to edge and preferably coinciding with the rows of openings. The reinforce is endless and of such diameter that when the tire is positioned upon the rim the reinforce as well as the material of the tire itself is placed under stress and consequently acts to grip the rim.

By externally stepping the rim and internally stepping the tire to complement the same, the tire may be easily placed upon the rim, the diameter of the larger step exceeding, as stated, the diameter of the smaller step portion of the rim so that the tire may be partially slipped upon the rim and then driven or forced home to completely set or position it on the rim. This may be effected without special tools and without injury to the tire. The edges of the tire are substantially flush with the edges of the rim, and there are no projecting portions or lugs or tire retaining elements to throw the wheel out of balance, or to project therefrom, which is a desirable safety feature.

The tires may be easily removed, and a further advantage is that they may be arranged compactly for packaging or storage without injury.

I have illustrated a very practical embodiment of my invention. I have not attempted to illustrate or describe various possible adaptations or modifications as it is believed this disclosure will enable those skilled in the art to embody or adapt my improvements as may be desired.

Having thus described my invention, what I claim as new and desire to secure by Letters Patent is:

1. A band saw wheel comprising an annularly stepped rim, a rubber tire internally stepped to complement the stepped rim, the normal internal diameter of the tire steps being less than the external diameter of the rim steps which they embrace, and a reinforcing core of resilient metal embedded in said tire and having rectangular openings of substantial size and uniform dimension, said core being transversely crimped and being under tension when the tire is assembled on the rim.

2. A band saw wheel comprising an annularly stepped rim, a tire of elastic material internally stepped to complement the stepped rim, the normal internal diameter of the tire steps being less than the external diameter of the rim steps which they embrace, and a foraminate reinforcing core of resilient metal embedded in said tire and having transverse corrugations and being under tension when the tire is assembled on the rim.

3. A band saw wheel comprising a rim, a rubber tire, the normal internal diameter of the tire being less than the external diameter of the rim, and a reinforcing core of resilient metal embedded in said tire and having rectangular openings of substantial size and uniform dimension, said core being transversely crimped and being under tension when the tire is assembled on the rim.

4. A band saw wheel comprising a rim, a rubber tire, the normal internal diameter of the tire being less than the external diameter of the rim, and a reinforcing core of resilient metal embedded in said tire and having rectangular openings of substantial size and uniform dimension, said core being transversely corrugated and being under longitudinal tension when the tire is assembled on the rim.

5. The combination with a band saw wheel provided with an annularly stepped rim, of an elastic tire internally stepped to complement the rim, and having a resilient foraminate metal reinforce embedded therein, the openings of said reinforce being rectangular in shape and of substantial size, said reinforce being transversely corrugated.

6. The combination with a band saw wheel provided with a rim, of a tire having a resilient foraminate metal reinforce embedded therein, the openings of said reinforce being transversely aligned, said reinforce being transversely corrugated.

7. A tire for band saws and the like formed of resilient rubber and having a reinforce of resilient foraminate metal embedded therein, said reinforce being transversely crimped, its openings being of uniform dimensions and disposed in transversely alined rows, the crimps coinciding with the rows of openings.

8. The combination with a band saw wheel provided with a rim, of an elastic tire and having a resilient foraminate metal reinforce embedded therein, the said reinforce being transversely crimped.

9. A tire for band saws and the like formed of resilient rubber and having a reinforce of resilient foraminate metal embedded therein, said reinforce being transversely corrugated.

10. A tire for band saws and the like formed of elastic material having a transversely corrugated reinforce of resilient foraminate metal embedded therein.

In witness whereof I have hereunto set my hand.

CARL E. TANNEWITZ.